US012531334B2

(12) United States Patent
Cercelaru et al.

(10) Patent No.: US 12,531,334 B2
(45) Date of Patent: Jan. 20, 2026

(54) MILLIMETER WAVE RADIO FREQUENCY PHASE SHIFTER

(71) Applicant: KYOCERA AVX Components (San Diego), Inc., San Diego, CA (US)

(72) Inventors: Sever Cercelaru, Le Bar sur Loup (FR); Olivier Pajona, Biot (FR)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 204 days.

(21) Appl. No.: 18/363,580

(22) Filed: Aug. 1, 2023

(65) Prior Publication Data

US 2024/0097327 A1 Mar. 21, 2024

Related U.S. Application Data

(63) Continuation of application No. 17/373,348, filed on Jul. 12, 2021, now Pat. No. 11,757,182, which is a (Continued)

(51) Int. Cl.
*H01Q 3/26* (2006.01)
*H01P 1/18* (2006.01)
(Continued)

(52) U.S. Cl.
CPC .......... *H01Q 3/2658* (2013.01); *H01P 1/184* (2013.01); *H01P 1/185* (2013.01); *H01Q 3/32* (2013.01);
(Continued)

(58) Field of Classification Search
CPC .......... H01P 1/184; H01P 1/181; H01P 1/185; H01P 1/19
See application file for complete search history.

(56) References Cited

U.S. PATENT DOCUMENTS

| | | | |
|---|---|---|---|
| 5,180,998 | A | 1/1993 | Willems |
| 7,907,096 | B2 | 3/2011 | Timofeev et al. |

(Continued)

FOREIGN PATENT DOCUMENTS

| | | | |
|---|---|---|---|
| CN | 2562496 | Y | 7/2003 |
| CN | 1652396 | A | 8/2005 |

(Continued)

OTHER PUBLICATIONS

International Search Report and Written Opinion for Application No. PCT/US2020/013422, mailed May 15, 2020, 12 pages.

(Continued)

*Primary Examiner* — Seokjin Kim
(74) *Attorney, Agent, or Firm* — Dority & Manning, P.A.

(57) ABSTRACT

A millimeter wave RF phase shifter includes an input and an output. The RF phase shifter further includes a transmission line coupled to the input. The transmission line can include a plurality of taps. The RF phase shifter can further include a plurality of switching devices. Each switching device can be coupled between the output and a corresponding tap of the plurality of taps. The RF phase shifter can include a control device operatively coupled to the plurality of switching devices. The control device can be configured to control operation of the plurality of switching devices to selectively couple one of the plurality of taps to the output to control a phase shift of a RF signal propagating on the transmission line.

19 Claims, 14 Drawing Sheets

Related U.S. Application Data continuation of application No. 16/741,867, filed on Jan. 14, 2020, now Pat. No. 11,063,352.

(60) Provisional application No. 62/793,603, filed on Jan. 17, 2019.

(51) Int. Cl.

| | |
|---|---|
| ***H01P 1/185*** | (2006.01) |
| ***H01Q 3/32*** | (2006.01) |
| ***H01Q 3/38*** | (2006.01) |
| ***H01Q 3/44*** | (2006.01) |
| ***H01Q 21/00*** | (2006.01) |

(52) U.S. Cl.

CPC ............... *H01Q 3/38* (2013.01); *H01Q 3/443* (2013.01); *H01Q 21/0006* (2013.01)

(56) References Cited

U.S. PATENT DOCUMENTS

| | | | | |
|---|---|---|---|---|
| 8,988,165 | B2 * | 3/2015 | Staudinger | H03F 1/3282 333/139 |
| 9,319,021 | B2 | 4/2016 | Ehyaie et al. | |
| 9,444,140 | B2 | 9/2016 | Maltsev et al. | |
| 10,033,349 | B2 * | 7/2018 | Gamal El Din | H03H 7/20 |
| 10,148,265 | B2 | 12/2018 | Lu et al. | |
| 10,680,581 | B2 | 6/2020 | Valdes Garcia et al. | |
| 11,063,352 | B2 * | 7/2021 | Cercelaru | H01P 1/185 |
| 2006/0109066 | A1 * | 5/2006 | Borysenko | H01P 1/185 333/164 |
| 2009/0189826 | A1 | 7/2009 | Timofeev et al. | |
| 2014/0155003 | A1 * | 6/2014 | Nakatani | H03H 7/48 330/250 |
| 2014/0191822 | A1 * | 7/2014 | Cisco | H01P 11/00 333/161 |
| 2015/0180439 | A1 * | 6/2015 | Reiha | H01P 1/184 333/139 |
| 2017/0187086 | A1 * | 6/2017 | Koul | H01H 59/0009 |
| 2017/0230028 | A1 * | 8/2017 | Gamal El Din | H03H 7/20 |
| 2018/0067204 | A1 * | 3/2018 | Frizzell | G01S 13/887 |
| 2018/0277963 | A1 | 9/2018 | Desclos et al. | |
| 2019/0103672 | A1 * | 4/2019 | Jackson | H03H 7/20 |
| 2019/0157754 | A1 * | 5/2019 | Valdes Garcia | H04B 1/00 |

FOREIGN PATENT DOCUMENTS

| | | | | |
|---|---|---|---|---|
| CN | 105356014 | A | 2/2016 | |
| EP | 1160906 | A | 12/2001 | |
| EP | 1160906 | A1 * | 12/2001 | H01P 1/184 |
| JP | S47 002140 | | 3/1970 | |
| JP | 2001-085902 | | 3/2001 | |
| KR | 20120135762 | | 12/2012 | |
| WO | WO-0054362 | A1 * | 9/2000 | H01P 1/184 |
| WO | WO2013046278 | A1 | 4/2013 | |
| WO | WO 2017/111883 | | 6/2017 | |

OTHER PUBLICATIONS

Park et al., "A 15-40 GHz CMOS True-Time Delay Circuit for UWB Multi-Antenna Systems," IEEE Microwave and Wireless Components Letters, vol. 23, Issue 3, Mar. 2013, pp. 149-151.

Extended European Search Report for Application No. 20741502.7, dated Jul. 1, 2022. 13 pages.

Feng et al., "A 1-21 GHz, 3-bit CMOS True Time Delay Chain with 274 ps Delay for Ultra-Broadband Phased Array Antennas", 2015 European Radar Conference, Sep. 9, 2015, pp. 325-328. 4 pages.

Parker, "Phased Arrays—Part I: Theory and Architectures", IEEE Transactions on Microwave Theory and Techniques vol. 50, Issue 3, Mar. 1, 2022, pp. 678-687. 10 pages.

* cited by examiner

MILLIMETER WAVE RADIO FREQUENCY PHASE SHIFTER

PRIORITY CLAIM

The present application is a continuation of and claims priority to U.S. application Ser. No. 17/373,348, now U.S. Pat. No. 11,757,182, filed on Jul. 12, 2021, which is a continuation of and claims priority to U.S. patent application Ser. No. 16/741,867, now U.S. Pat. No. 11,063,352, filed on Jan. 14, 2020, which is based on and claims priority to U.S. Provisional Application No. 62/793,603, titled "Wireless Radio Control for Sensors," having a filing date of Jan. 17, 2019, which is incorporated by reference herein.

FIELD

The present disclosure relates generally to millimeter wave radio frequency (RF) phase shifters.

BACKGROUND

Antenna systems configured for millimeter-wave communications (e.g., $5^{th}$ generation mobile communications) can include RF phase shifters. Example RF phase shifters can alter a millimeter wave RF signal propagating along a transmission line such that a phase of the RF signal measured at the output of the transmission line is different relative to a phase of the RF signal measured at the input of the transmission line. In this manner, RF phase shifters can control a phase shift of the RF signal. Example antenna systems having RF phase shifters can include a phased array antenna system that include a plurality of antenna elements. The RF phase shifters of such antenna systems can control a phase shift of a RF wave emitted by each of the plurality of antenna elements. Alternatively or additionally, the RF phase shifters can be used to reconstruct a RF signal received from multiple different directions without moving the antenna elements.

SUMMARY

Aspects and advantages of embodiments of the present disclosure will be set forth in part in the following description, or may be learned from the description, or may be learned through practice of the embodiments.

In one aspect, a millimeter wave RF phase shifter is provided. The millimeter wave RF phase shifter includes an input and an output. The RF phase shifter further includes a transmission line coupled to the input. The transmission line can include a plurality of taps. The RF phase shifter can further include a plurality of switching devices. Each switching device can be coupled between the output and a corresponding tap of the plurality of taps. The RF phase shifter can include a control device operatively coupled to the plurality of switching devices. The control device can be configured to control operation of the plurality of switching devices to selectively couple one of the plurality of taps to the output to control a phase shift of a RF signal propagating on the transmission line.

In another aspect, a phased array antenna system is provided. The phased array antenna system includes a RF source configured to provide a RF signal. The phased array antenna system further includes a plurality of antenna elements. In addition, the phased array antenna system includes a plurality of millimeter wave RF phase shifters. Each of the plurality of millimeter wave RF phase shifters includes an input couplable to the RF source. Each of the plurality of millimeter wave RF phase shifters further include an output couplable to a corresponding antenna element of the plurality of antenna elements. Each of the plurality of millimeter wave RF phase shifters include a transmission line coupled to the input. The transmission line includes a plurality of taps spaced apart from one another along the transmission line. Each of the plurality of millimeter wave RF phase shifters includes a plurality of switching devices. Each of the plurality of switching devices is coupled between the output and a corresponding tap of the plurality of taps. Each of the plurality of millimeter wave RF phase shifters include a control device operatively coupled to the plurality of switching devices. The control device can be configured to control operation of the plurality of switching devices to selectively couple one of the plurality of taps to the output to adjust an electrical length of the transmission line to control a phase shift of a RF signal propagating on the transmission line.

In yet another aspect, a method of controlling operation of a millimeter wave RF phase shifter having a transmission line that includes a plurality of taps is provided. The method includes obtaining, by one or more control devices, data indicative of a desired phase shift of a RF signal provided to an input of the millimeter wave RF phase shifter. The method can further include controlling, by the one or more control devices, operation of a plurality of switching devices to adjust an electrical length of the transmission line based, at least in part, on the data indicative of the desired phase shift of the RF signal. The method further includes providing, by the one or more control devices, the RF signal to an output of the RF phase shifter via one of the plurality of taps of the transmission line.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
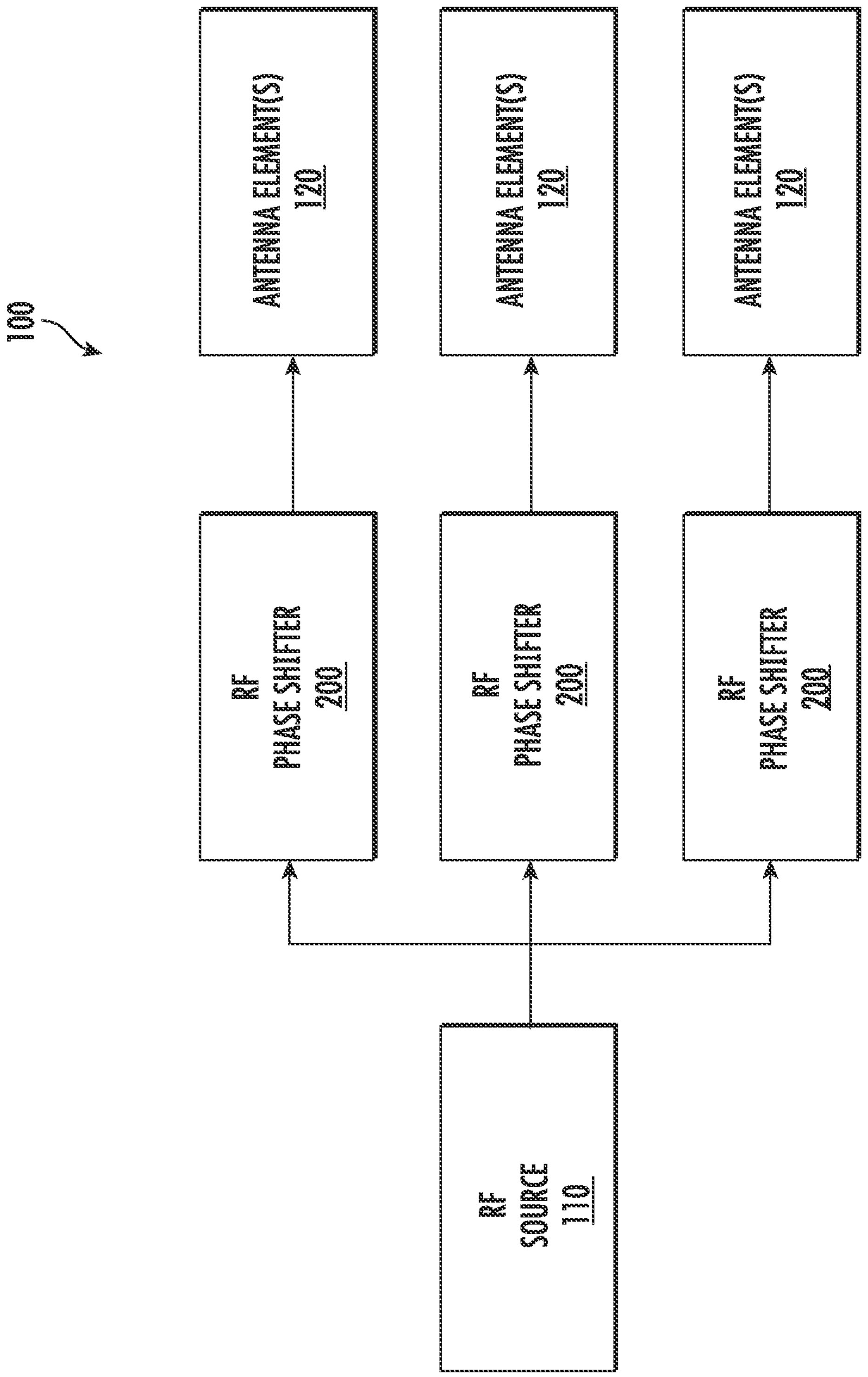
FIG. 1 depicts a block diagram of components of a phased array antenna system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a millimeter wave RF phase shifter. Antenna systems based on millimeter waves operate at very high frequencies (e.g., above 15 GHz). Such systems employ various beam forming techniques, (e.g., mechanical and/or electrical) to control a phase and amplitude of millimeter RF waves. In this manner, a radiation pattern of an antenna system can be steered without physically moving one or more antenna elements of the antenna system. Conventional antenna systems based on millimeter waves include RF phase shifters having transmission lines. In particular, conventional antenna systems modify one or more parameters (e.g., capacitance and/or inductance) of the transmission line to change a propagation delay (and hence, phase) of a millimeter RF wave propagating on the transmission line.

The millimeter wave RF phase shifter of the present disclosure can include a transmission line having a plurality of taps. The plurality of taps can be spaced apart from one another along the transmission line. The RF phase shifter can include a plurality of switching devices. Each switching device of the plurality of switching devices can be coupled between an input of RF phase shifter and a corresponding tap of the plurality of taps. The RF phase shifter can include a control device operatively coupled to the plurality of switching devices. In some implementations, the control device can control operation of the switching devices to selectively couple one of the plurality of taps to an output of the RF phase shifter. In this manner, the one or more control devices can adjust the electrical length of the transmission line to control a phase shift of a RF signal propagating along the transmission line.

In example embodiments, the plurality of switching devices can include a first plurality of switching devices and a second plurality of switching devices. Each first switching device of the plurality of first switching devices can be selectively coupled to a corresponding tap of the transmission line. For instance, the one or more control devices can be configured to provide a bias signal to only one first switching device at a time. As such, only one first switching device can be coupled to a corresponding tap of the transmission line at a time. In this manner, the one or more control devices can provide the bias signal to a first switching device that, when coupled to a corresponding tap of the transmission, configures the electrical length of the transmission line as needed to provide a desired phase shift of a RF signal propagating on the transmission line. Furthermore, while the first switching device is coupled to the corresponding tap, the one or more control devices can provide a control signal to a corresponding second switching device of the plurality of second switching devices to selectively couple the corresponding tap to the output of the RF phase shifter.

In some implementations, a shape of the transmission line can be modified to minimize an amount of space the transmission occupies on an integrated circuit or printed circuit board. For instance, in some implementations, the transmission line can be a meander transmission line having one or more bends. In alternative implementations, the transmission line can have an annular shape. Examples of an annular shape can include, without limitation, a ring, a circle and an ellipse. In such implementations, identical access from individual taps to the output of the RF phase shifter can be achieved.

The RF phase shifter of the present disclosure provides numerous technical advantages. For instance, the plurality of taps of the transmission line allow an electrical length of the transmission line to be varied to accommodate a desired phase shift of a RF signal propagating along the transmission line. More specifically, the electrical length of the transmission line can be varied without requiring additional components that are needed in conventional RF phase shifters. In this manner, an amount of space the RF phase shifter of the present disclosure occupies on an integrated circuit or printed circuit board can be minimized compared to an amount of space conventional RF phase shifters occupy on the same integrated circuit or PCB.

As used herein, the use of the term "about" in conjunction with a numerical value is intended to refer to within 20% of the stated amount. In addition, the terms "first," "second," and "third" may be used interchangeably to distinguish one component from another and are not intended to signify location or importance of the individual components. Furthermore, the term "millimeter wave" refers to RF signals having a wavelength in the range of 0.5 millimeter to tens of millimeters (e.g., less than 100 millimeters).

Referring now to the Figures, FIG. 1 depicts a phased array antenna system 100 according to example embodiments of the present disclosure. As shown, the phased array antenna system 100 can include a RF source 110 and a plurality of antenna elements 120. The RF source 110 can be configured to provide a RF signal to the plurality of antenna elements 120. In some implementations, a frequency of the RF signal can be between about 26.5 GHz and about 33 GHz. Alternatively or additionally, the RF signal can have a wavelength between about 0.5. millimeters and 12 millimeters.

As shown, the phased array antenna system 100 can include a plurality of RF phase shifters 200. In some implementations, each RF phase shifter of the plurality of RF phase shifters 200 can be coupled between the RF source 110 and a corresponding antenna element of the plurality of antenna elements 120. As will be discussed below in more detail, the plurality of RF phase shifters 200 can be configured to control a phase shift of the RF signal generated by the RF source 110. In this manner, the radiation pattern of RF waves emitted via the plurality of antenna elements 120 can be steered without physically moving the antenna elements 120.

Figure 2:
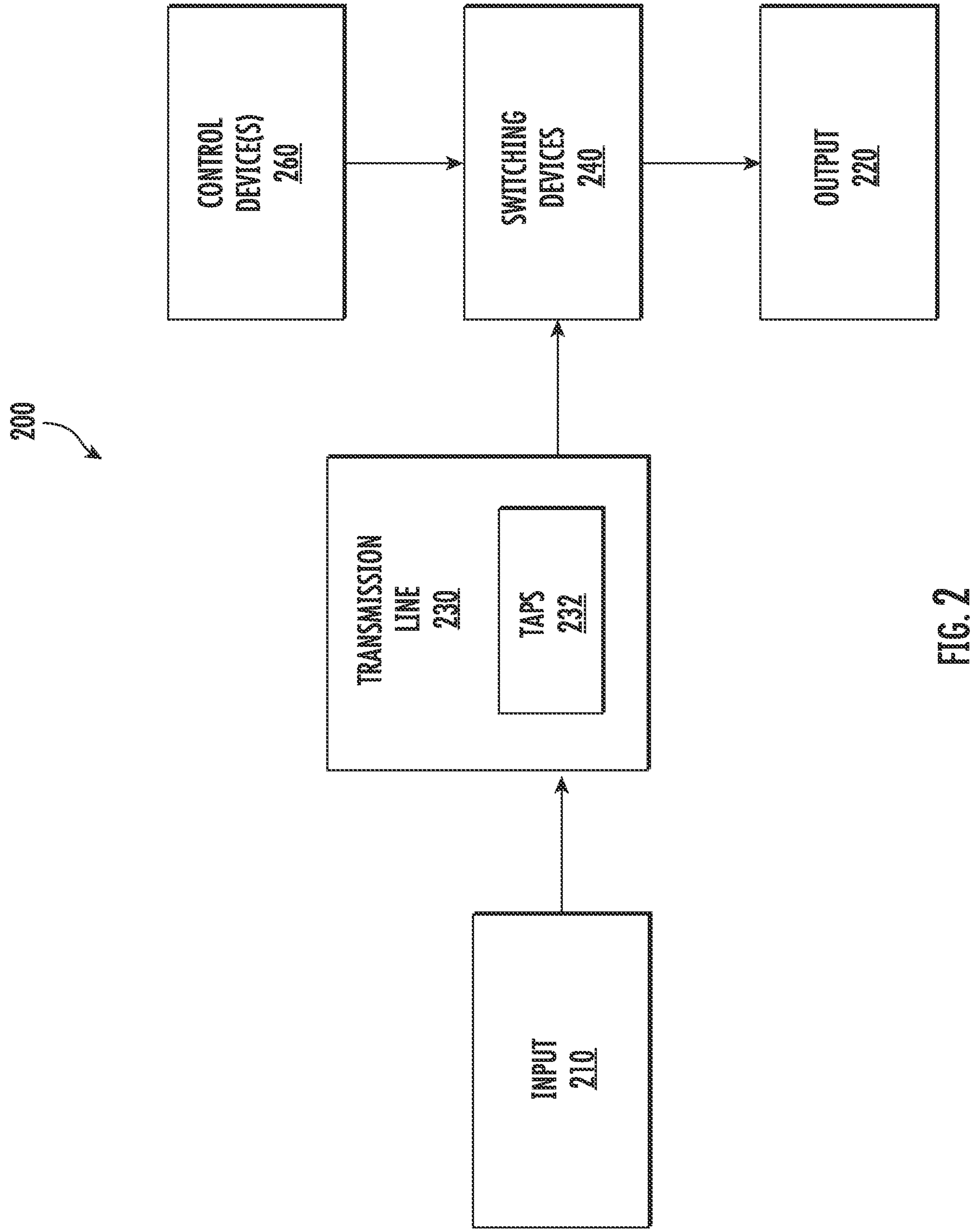
FIG. 2 depicts a block diagram of components of a millimeter wave RF phase shifter according to example embodiments of the present disclosure.

Referring now to FIG. 2, components of one of the RF phase shifters 200 is provided according to example embodiments of the present disclosure. As shown, the RF phase shifter 200 can include an input 210 and an output 220. In some implementations, the input 210 can be couplable to an RF source, such as the RF source 110 of the phased array antenna system 100 discussed above with reference to FIG. 1. Alternatively or additionally, the output 220 of the RF phase shifter 200 can be couplable to an antenna element, such as one of the plurality of antenna elements 120 of the phased array antenna system 100 discussed above with reference to FIG. 1.

Although the RF phase shifter 200 depicted in FIG. 2 is illustrated as part of a transmission (TX) circuit, it should be appreciated that the millimeter wave RF phase shifter of the present disclosure can be implemented in a receive (RX) circuit in which RF signals are received via one or more antenna elements 120 and provided to one or more components (e.g., filter, processor, etc.) of the antenna system via the RF phase shifter 200. For example, in such implementations, the input 210 of the RF phase shifter 200 can be coupled to one of the plurality of antenna elements 120, and the output 220 of the RF phase shifter 200 can be coupled to a control device associated with the array antenna system 100. In this manner, RF signals received at the antenna element 120 can be provided to the control device via the RF phase shifter 200.

As shown, each RF phase shifter of the plurality of RF phase shifters 200 can include a transmission line 230. In some implementations, the transmission line 230 can be coupled to the input 210 of the RF phase shifter 200. The transmission line 230 can include a plurality of taps 232 (only one shown). In some implementations, the plurality of taps 232 can be spaced apart from one another along a length of the transmission line 230. As will be discussed below, one of the plurality of taps 232 can be selectively coupled to the output 220 of the RF phase shifter 200 to vary an electrical length of the transmission line 230. In this manner, a phase shift of a RF signal propagating along the transmission line 230 can be controlled.

In some implementations, the RF phase shifter 200 can include a plurality of switching devices 240 (only one shown) coupled between the transmission line 230 and the output 220 of the RF phase shifter 200. For example, each switching device of the plurality of switching devices 240 can be coupled between the output 220 and a corresponding tap of the plurality of taps 232. In this manner, each switching device of the plurality of switching devices 240 can selectively couple a corresponding tap 232 of the transmission line 230 to the output 220 of the RF phase shifter 200. In example embodiments, the plurality of switching devices 240 can transition between a first state and a second state. When a switching device of the plurality of switching devices 240 is in the first state, a corresponding tap 232 of the transmission line can be coupled to the output 220 of the RF phase shifter 200 via the switching device. Conversely, when the switching device is in the second state, the corresponding tap 232 is not coupled to the output 220 of the RF phase shifter 200 via the switching device. In this manner, operation of the plurality of switching devices 240 can be controlled to adjust (e.g., lengthen or shorten) an electrical length of the transmission line 230 as needed to provide a desired phase shift of a RF signal propagating on the transmission line 230.

It should be appreciated that the RF signal propagating on the transmission line 230 can be generated at any suitable location. For instance, in some implementations, the RF signal can be generated via the RF source 110 (FIG. 1) of the array antenna system 100. In alternative implementations, the RF signal can be generated via an RF source associated with another antenna system and can be received via one or more antenna elements 120 (FIG. 1) of the phased array antenna system 100.

It should also be appreciated that the plurality of switching devices 240 can include any suitable device configured to selectively couple a corresponding tap 232 of the transmission line 230 to the output 220 of the RF phase shifter 200. For instance, in some implementations, the switching devices 240 can include one or more contactors. Alternatively, the plurality of switching devices 240 can include one or more transistors, one or more silicon controlled rectifier (SCR), one or more TRIACs, or any other suitable device configured to selectively couple a corresponding tap 232 of the transmission line 230 to the output 220 of the RF phase shifter 200.

In some implementations, the RF phase shifter 200 can include one or more control devices 260 operatively coupled to the plurality of switching devices 240. The one or more control devices 260 can be configured to control operation of the switching devices 240 to selectively couple one of the plurality of taps 232 of the transmission line 230 to the output 220 of the RF phase shifter 200. As such, the one or more control devices 260 can control operation of the switching devices 240 to adjust (e.g., lengthen or shorten) the electrical length of the transmission line 230. In this manner, the one or more control devices 260 can adjust the electrical length of the transmission line 230 as needed to provide a desired phase shift of a RF signal propagating on the transmission line 230.

Figure 3:
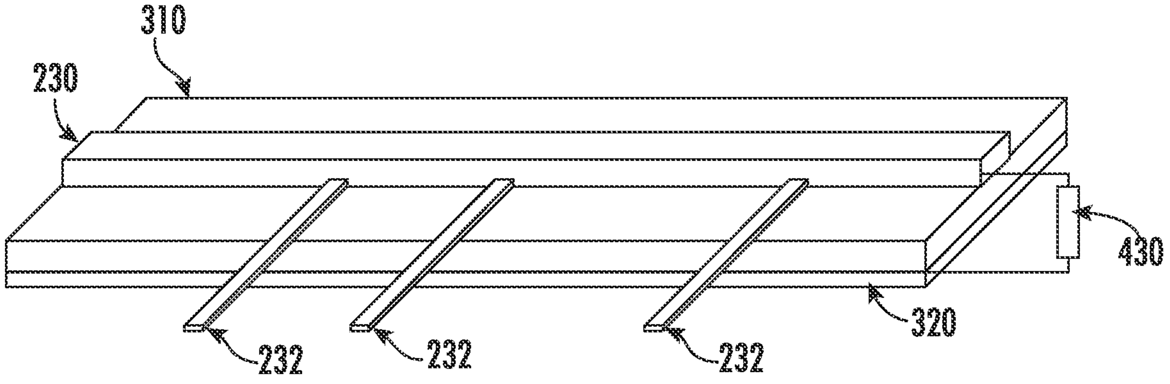
FIG. 3 depicts a transmission line of a millimeter wave RF phase shifter according to example embodiments of the present disclosure.

FIG. 3 depicts an example embodiment of the transmission line 230 is provided according to the present disclosure. As shown, the transmission line 230 can be a microstrip conductor implemented on a layer of dielectric material 310 positioned between the transmission line 230 and a ground plane 320. Alternatively, the transmission line 230 can be implemented on top of a metal plate of an integrated circuit. As shown, the transmission line 230 can include a plurality of taps 232 spaced apart from one another along a length L of the transmission line 230. For example, the transmission line 230 can, as depicted in FIG. 3, have three separate taps 232. It should be appreciated, however, that the transmission line 230 can include more or fewer taps 232. For instance, in some implementations, the transmission line 230 can include as many as twenty-eight separate taps 232.

Figure 4:
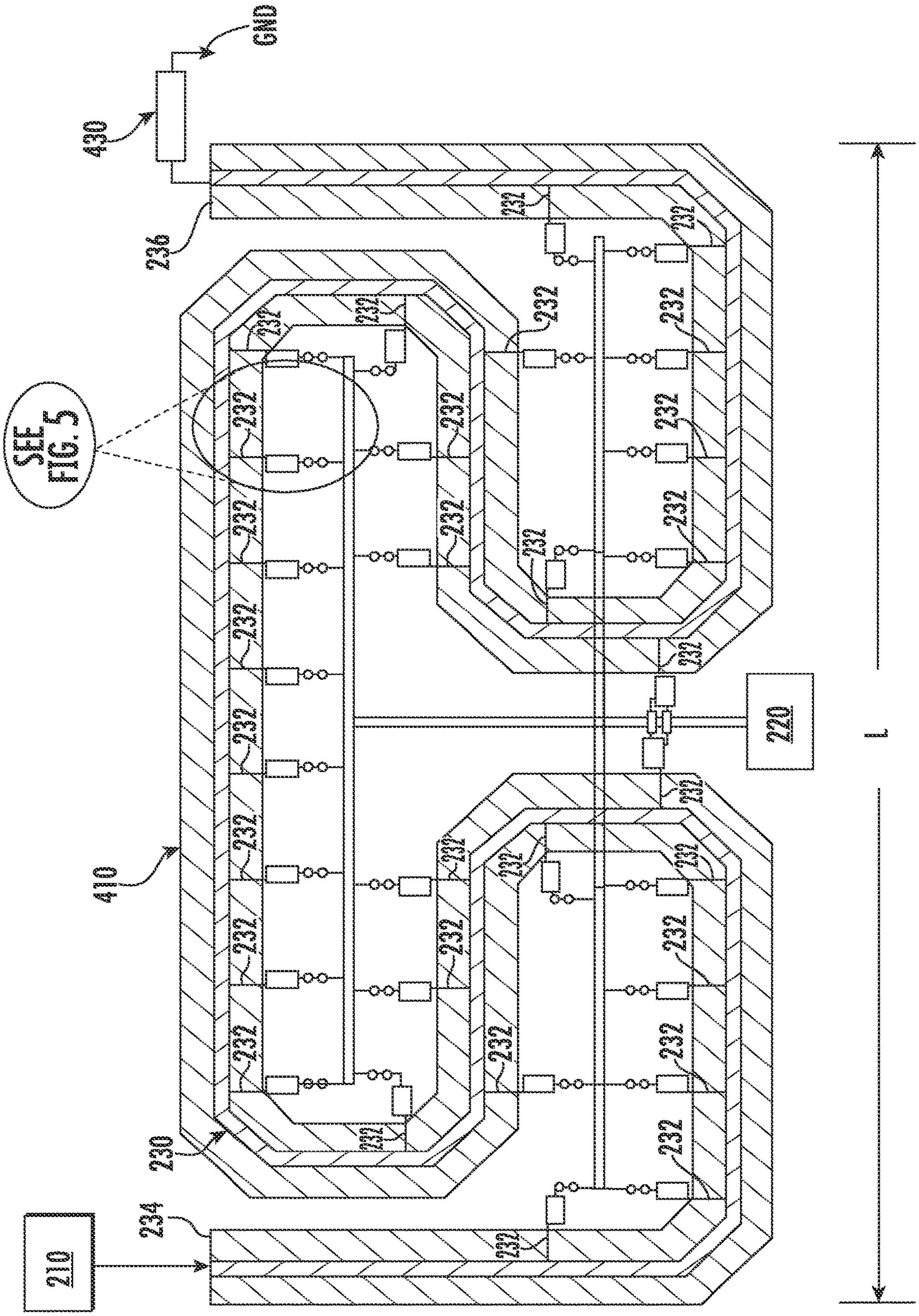
FIG. 4 depicts a transmission line of a millimeter wave RF phase shifter according to example embodiments of the present disclosure.

FIG. 4 depicts another example embodiment of the transmission line 230 according to the present disclosure. In some implementations, the transmission line 230 can be implemented on top of a ground plane 410 of a printed circuit board. Alternatively, the transmission line 230 can be implemented on top of a metal plate of an integrated circuit. As shown, the transmission line 230 can extend between a first end 234 and a second end 236. The transmission line 230 illustrated in FIG. 4 is a meander transmission line having one or more bends between the first end 234 and the second end 236. The one or more bends in the meander transmission line can reduce the overall length of the meander transmission line as compared to the length of a transmission line that does not include the one or more bends, such as the transmission line 230 discussed above with reference to FIG. 3. In this manner, the transmission line 230 is more compact and therefore occupies less spaced on an integrated circuit or printed circuit board.

In some implementations, the first end 234 of the transmission line 230 can be coupled to the input 210 of the RF phase shifter 200 (FIG. 2). In this manner, one or more RF signals generated via an RF source (e.g., RF source 110 of FIG. 1) can be provided to the transmission line 230. Alternatively or additionally, the RF phase shifter 200 (FIG. 2) can include a load resistor 430 coupled between ground GND and the second end 236 of the transmission line 230. It should be appreciated that the load resistor 430 can have any suitable value of resistance. It should also be appreciated that the value of the load seen at a tap 232 that is coupled to the output 220 can be modified depending on the configuration of one or more taps 232 positioned between the load resistor 430 and the tap 232 currently coupled to the output 220.

Figure 5:
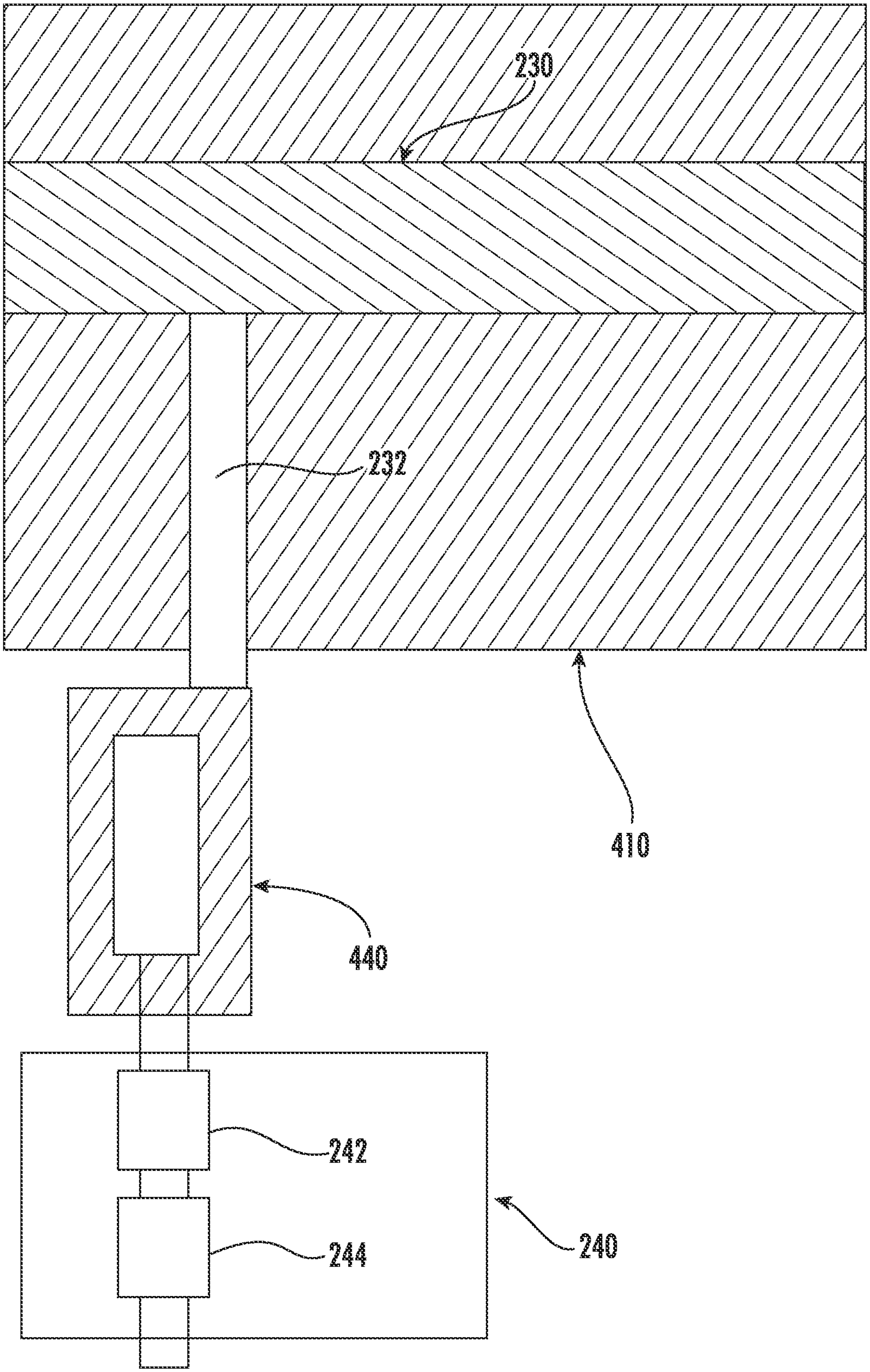
FIG. 5 depicts a zoomed-in view of a portion of the transmission line depicted in FIG. 4 according to example embodiments of the present disclosure.

As shown, the taps 232 of the transmission line 230 can be spaced apart along a length L of the transmission line 230. Also, although the transmission line 230 depicted in FIG. 4 includes twenty-eight separate taps 232, it should be appreciated that the transmission line 230 can include more or fewer taps 232. Referring briefly now to FIG. 5, the plurality of switching devices 240 of the RF phase shifter 200 (FIG. 2) can include a plurality of first switching devices 242 and a plurality of second switching devices 244. As will be discussed below, each tap of the plurality of taps 232 can be coupled to a corresponding first switching device 242 via coupling circuitry 440 of the RF phase shifter 200 (FIG. 2).

In some implementations, the coupling circuitry 440 can include one or more components (e.g., capacitors) configured to couple a corresponding tap 232 of the transmission line 230 to a corresponding first switching device 242 via alternating current (AC) coupling. Alternatively, the circuitry 440 can include one or more components configured to couple a corresponding tap 232 of the transmission line 230 to a corresponding first switching device 242 via direct current (DC) coupling.

It should be appreciated that the plurality of first switching devices 242 and the plurality of second switching devices 244 can include any suitable type of transistor. For example, in some implementations the plurality of first switching devices 242 can be bipolar junction transistors (BJTs). In alternative implementations, the plurality of first switching devices 242 can be metal-oxide silicon field effect transistors (MOSFETs).

Figure 6:
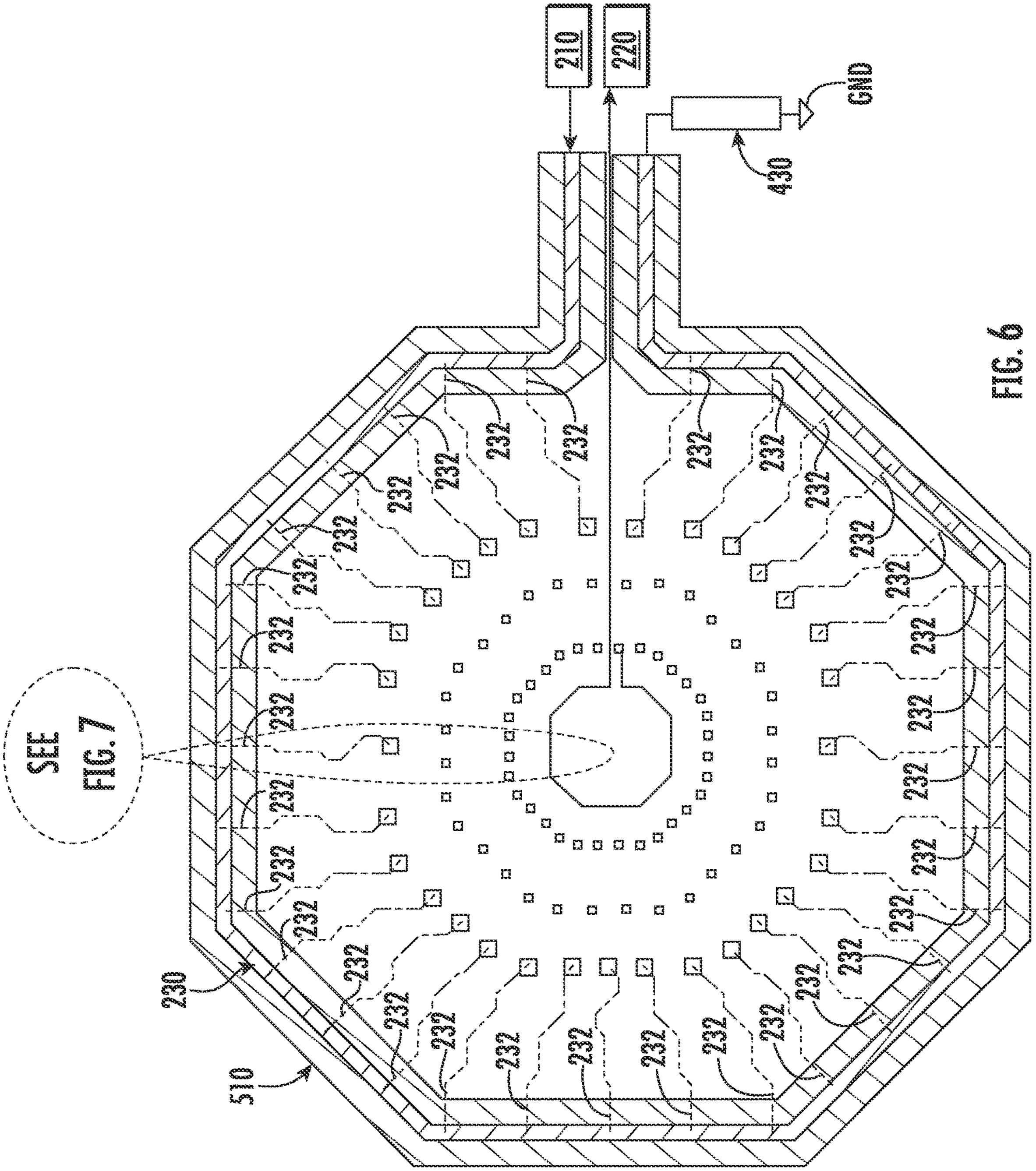
FIG. 6 depicts a transmission line of a millimeter wave RF phase shifter according to example embodiments of the present disclosure.

Referring now to FIG. 6, yet another example embodiment of the transmission line 230 is provided according to the present disclosure. In some implementations, the transmission line 230 can be implemented on top of a ground plane 510 of a printed circuit board. Alternatively, the transmission line 230 can be implemented on a metal plate of an integrated circuit. As shown in the embodiment illustrated in FIG. 6, a shape of the transmission line 230 can correspond to an octagon. It should be appreciated, however, that the transmission line 230 can be configured as any suitable shape or polygon. For instance, in some implementations, the transmission line 230 can have an annular shape. Examples of the annular shape can include, without limitation, a ring, a circle, or an ellipse.

It should be appreciated that the length of the transmission line 230 depicted in FIG. 6 can be about 510 micrometers. Conversely, the length L of the transmission line 230 depicted in FIG. 4 can be about 560 micrometers. As such, an amount of space the transmission line 230 of FIG. 6 occupies on a PCB or integrated circuit can be less compared to an amount of space the transmission line 230 of FIG. 4 occupies on the same PCB or integrated circuit.

Figure 7:
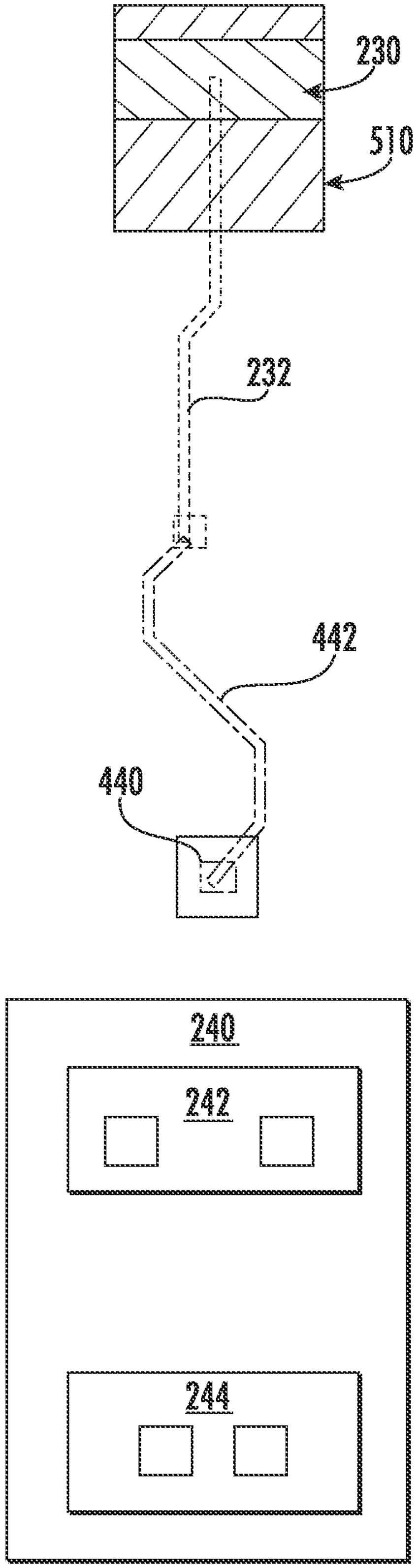
FIG. 7 depicts a zoomed-in view of a portion of the transmission line depicted in FIG. 6 according to example embodiments of the present disclosure.

As shown, the plurality of taps 232 of the transmission line 230 can be spaced apart along the transmission line 230. Also, although the transmission line 230 depicted in FIG. 6 includes thirty-two separate taps 232, it should be appreciated that the transmission line 230 can include more or fewer taps 232. Referring briefly now to FIG. 7, the plurality of switching devices 240 configured to selectively couple one of the plurality of taps 232 (only one shown) of the transmission line 230 to the output 220 (FIG. 2) of the RF phase shifter 200 can include the plurality of first switching devices 242 and the plurality of second switching devices 244 discussed above with reference to FIG. 5.

As shown, each tap of the plurality of taps 232 can be coupled to a corresponding first switching device 242 via the coupling circuitry 440 discussed above with reference to FIG. 5. In some implementations, the coupling circuitry 440 can be coupled to a corresponding tap of the plurality of taps 232 via one or more conductors 442 (e.g., wires or metal traces integrated circuit). As will be discussed below in more detail, the control device 260 (FIG. 2) of the RF phase shifter 200 can control operation of the first switching devices 242 and the second switching devices 244 to selectively couple one of the plurality of taps 232 to the output 220 (FIG. 2) of the RF phase shifter 200. In this manner, the control device 260 can control operation of the first switching devices 242 and the second switching devices 244 to adjust (e.g., lengthen or shorten) an electrical length of the transmission line 230 to provide a desired phase shift of a RF signal propagating on the transmission line 230.

Figure 8:
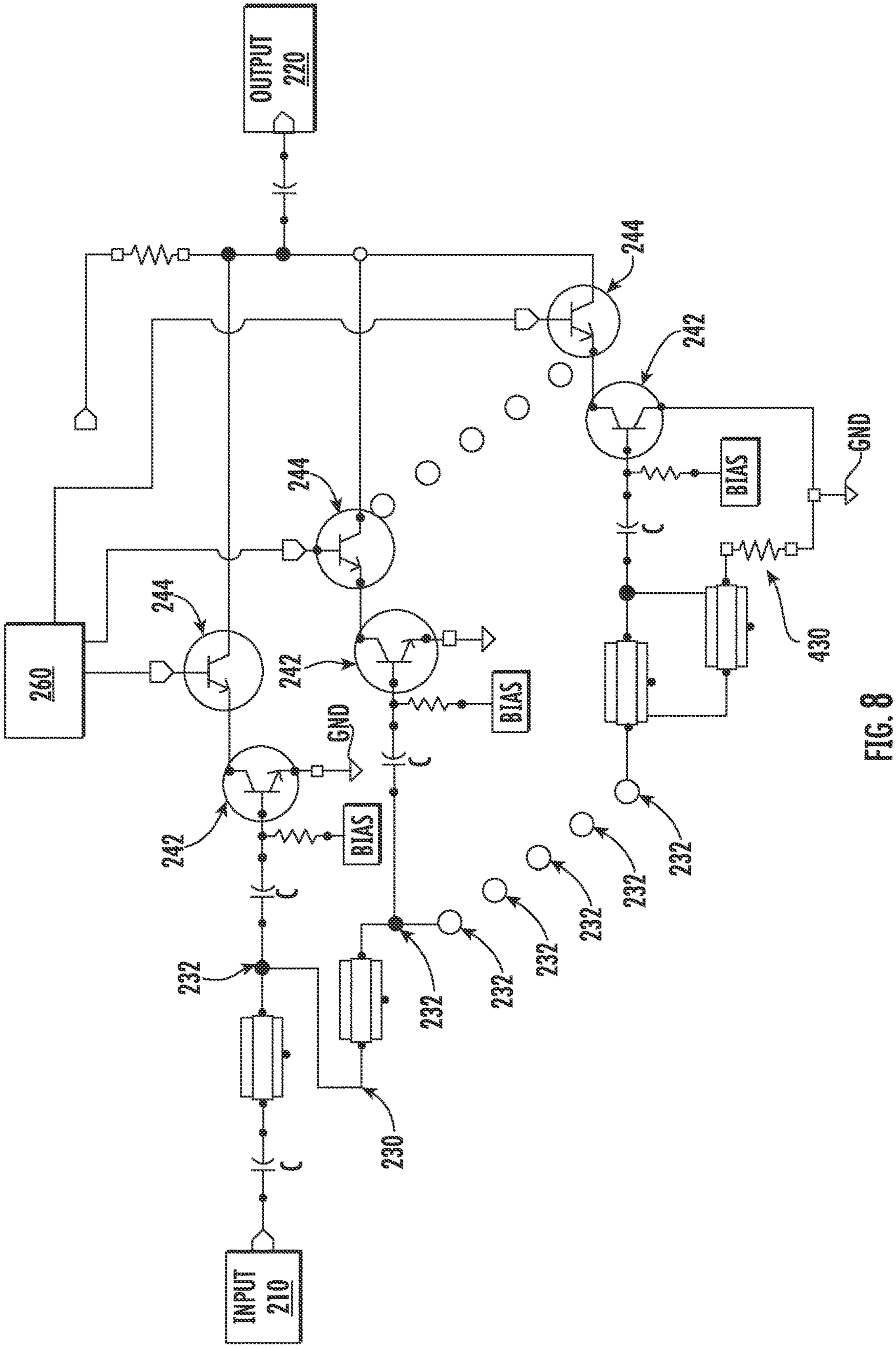
FIG. 8 depicts a circuit diagram of an example implementation of a millimeter wave RF phase shifter according to example embodiments of the present disclosure.
Figure 9:
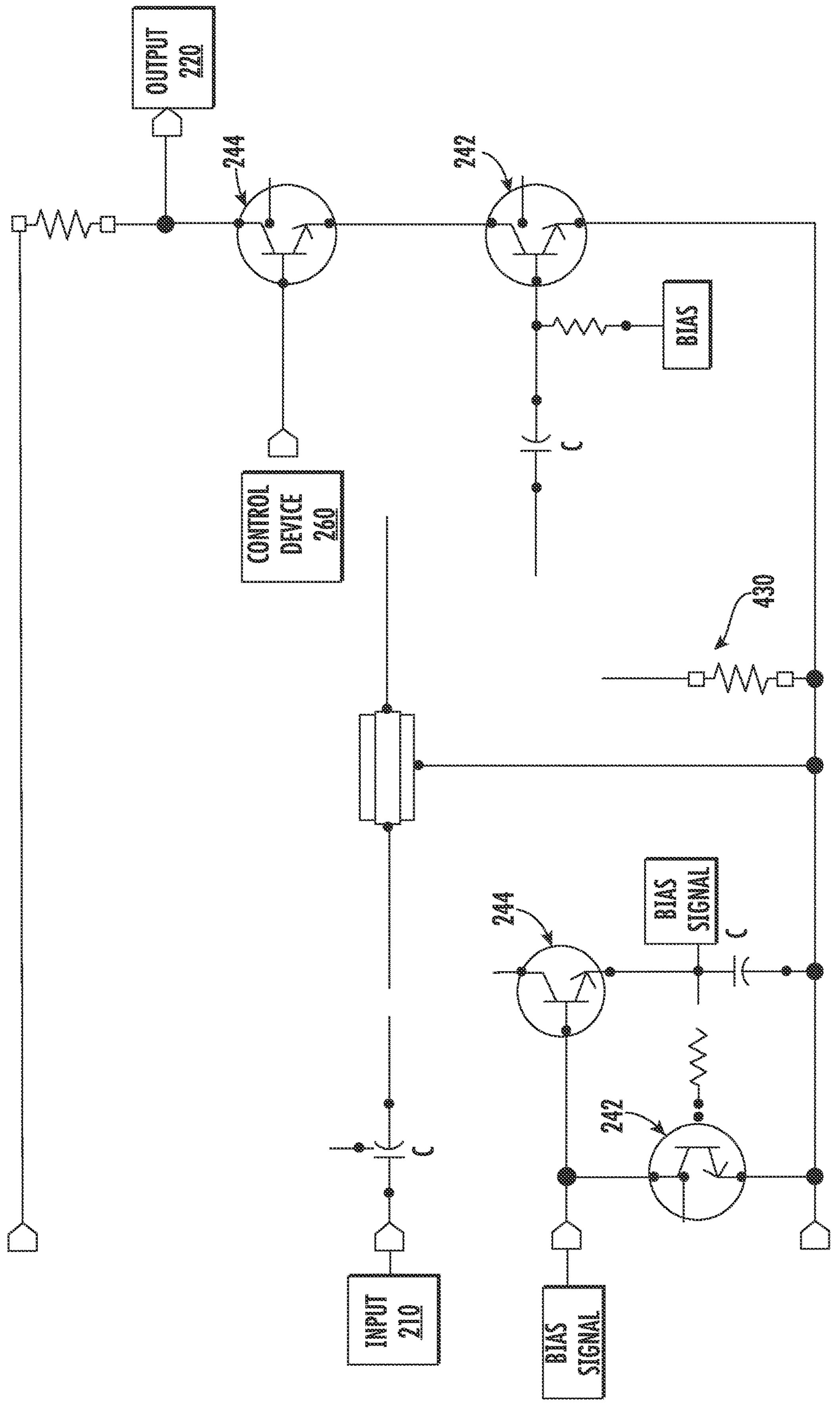
FIG. 9 depicts a circuit diagram of an example implementation of a millimeter wave RF phase shifter according to example embodiments of the present disclosure.

Referring now to FIGS. 8 and 9, circuit diagrams illustrating example implementations of the RF phase shifter 200 are provided according to example embodiments of the present disclosure. In some implementations, each of the plurality of first switching devices 242 can be coupled to a corresponding tap of the plurality of taps 232 (FIG. 2) via the coupling circuitry 440 (FIGS. 5 and 7) of the RF phase shifter 200 (FIG. 2). For example, in some implementations, the coupling circuitry 440 can include one or more capacitors C coupled between a corresponding tap 232 and a corresponding first switching device 242.

In some implementations, the one or more control devices 260 (FIG. 2) of the RF phase shifter 200 (FIG. 2) can provide a bias signal to one of the plurality of first switching devices 242 at a time. In such implementations, only the first switching device 242 receiving the bias signal can be coupled to a corresponding tap 232 of the transmission line 230 via the coupling circuitry 440 (FIGS. 5 and 7). In this manner, the one or more control devices 260 can control operation of the first plurality of switching devices 242 to adjust (e.g., lengthen or shorten) an electrical length of the transmission line 230. For example, the electrical length of the transmission line 230 can correspond to a distance measured from the first end 234 (FIG. 4) of the transmission line 230 to a corresponding tap 232 that is coupled to a corresponding first switching device 242 via the coupling circuitry 440 (FIGS. 5 and 7).

In some implementations, each second switching device of the plurality of second switching devices 244 can be coupled to a corresponding first switching device of the plurality of first switching devices 242. In such implementations, the one or more control devices 260 can control operation of the second switching devices 244 to selectively couple a corresponding tap 232 to the output 220 (FIG. 2) of the RF phase shifter 200 via the corresponding first switching device 242.

In some implementations, the taps 232 of the transmission line 230 can be spaced apart from one another along a length of the transmission line 230 such that the phase shift of an RF signal propagating on the transmission line 230 can increase in a linear manner as the electrical length of the transmission line 230 is increased. For example, a phase shift of the RF signal when a first tap of the transmission line 230 is coupled to the output 220 of the RF phase shifter 200 may be about 5 degrees. Conversely, a phase shift of the RF signal when coupled to a second tap positioned adjacent to the first tap without any intervening taps positioned therebetween may be about 10 degrees. As such, the phase shift of the RF signal may increase in increments of about 5 degrees as the electrical length of the transmission line 230 increases. In some implementations, the phase shift can increase in increments of about 5 degrees until the electrical length of the transmission line 230 provides a maximum phase shift of about one-hundred and eighty degrees (180°).

Figure 10:
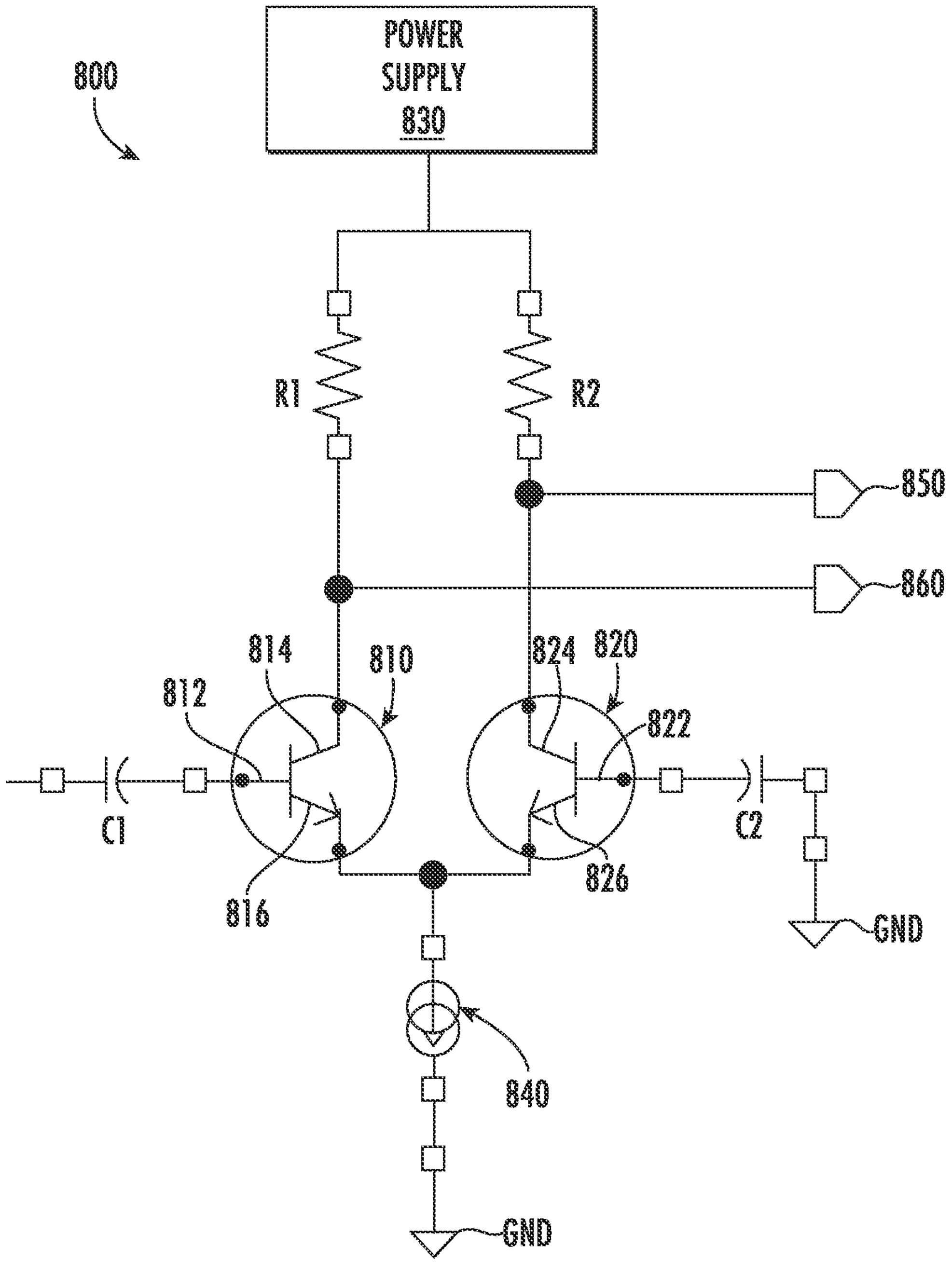
FIG. 10 depicts a circuit diagram of a differential amplifier of a millimeter wave RF phase shifter according to example embodiments of the present disclosure.

In some implementations, the RF phase shifter 200 can include a differential amplifier to provide an additional phase shift of a RF signal beyond what is provided via adjusting the electrical length of the transmission line 230. FIG. 10 depicts a circuit diagram of a differential amplifier 800 according to example embodiments of the present disclosure. As shown, the differential amplifier 800 can include a first switching device 810 and a second switching device 820. Examples of the first switching device 810 and the second switching device 820 can include any suitable type of transistor. For instance, in some implementations, the first switching device 810 and the second switching device 820 can be bipolar junction transistors (BJTs). In alternative implementations, the first switching device 810 and the second switching device 820 can be metal-oxide field effect transistors (MOSFETs).

The first switching device 810 can include a first terminal 812, a second terminal 814, and a third terminal 816. The first terminal 812 can be coupled to the input 210 (FIG. 2) of the RF phase shifter 200 (FIG. 2) via one or more conductors (e.g., wires or traces in an integrated circuit). In some implementations, the differential amplifier 800 can include a first capacitor C1 coupled between the first terminal 812 and the input 210 (FIG. 2) of the RF phase shifter 200. The second terminal 814 can be coupled to a power supply 830 via one or more conductors. In some implementations, the differential amplifier 800 can include a first resistor R1 coupled between the second terminal 814 and the power supply 830. The third terminal 816 can be coupled to ground GND via one or more conductors. In some implementations, the differential amplifier 800 can include a current source 840 coupled between the third terminal 816 and ground GND.

The second switching device 820 can include a first terminal 822, a second terminal 824, and a third terminal 826. The first terminal 822 can be coupled to ground GND via one or more conductors. In some implementations, the differential amplifier 800 can include a second capacitor C2 coupled between ground GND and the first terminal 822. The second terminal 824 can be coupled to the power supply 830 via one or more conductors. In some implementations, the differential amplifier 800 can include a second resistor R2 coupled between the second terminal 824 and the power supply 830. The third terminal 826 can be coupled to ground GND via one or more conductors. In some implementations, the current source 840 can be coupled between the third terminal 826 and ground GND.

In some implementations, the differential amplifier 800 can include a first output 850 and a second output 860. It should be appreciated that a phase of a RF signal emitted via the first output 850 can be different than a phase of a RF signal emitted via the second output 860. For instance, the RF signal emitted via the second output 860 can be about one hundred and eighty degrees (e.g., 180°) out-of-phase relative to the RF signal emitted via the first output 850.

Figure 11:
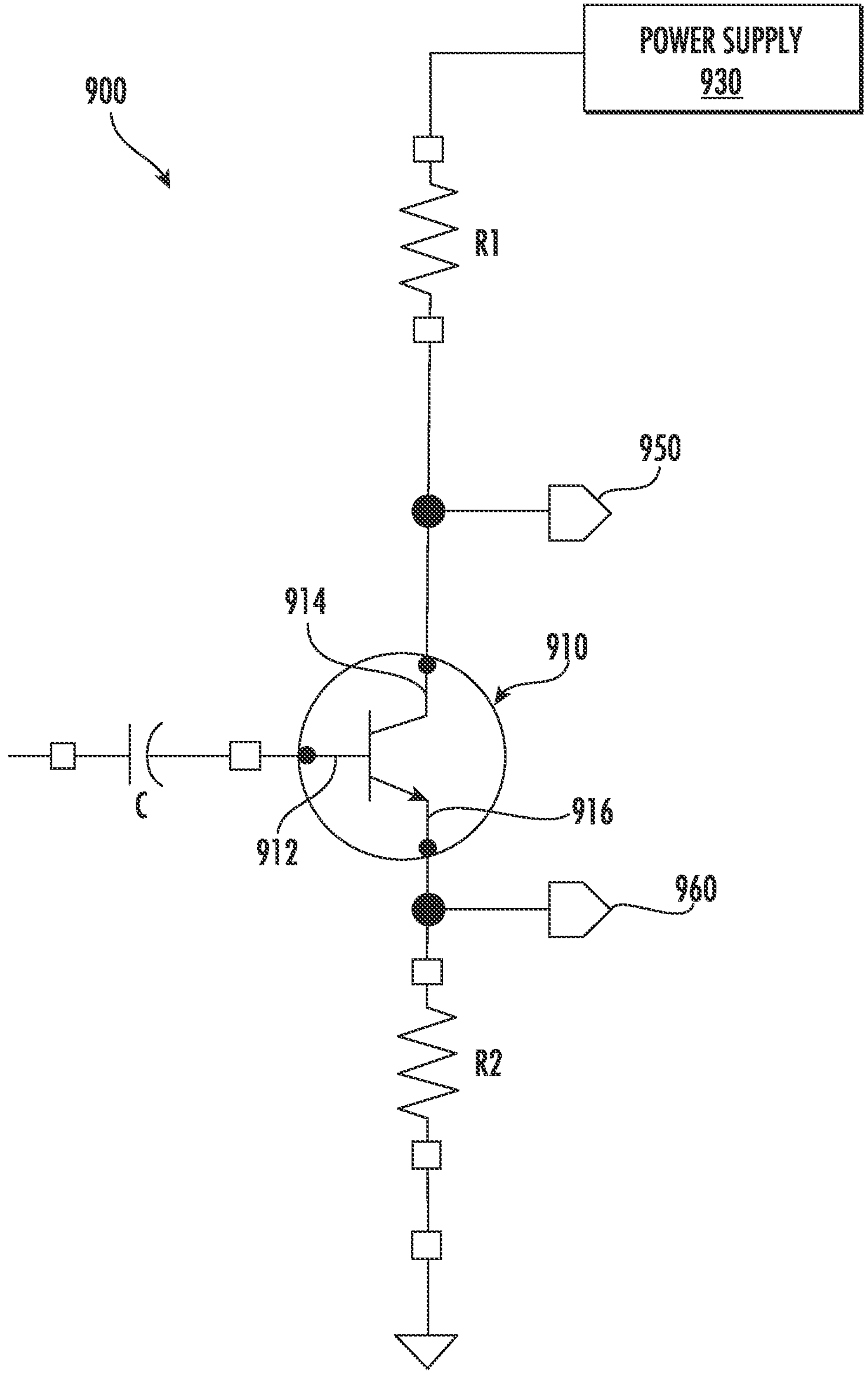
FIG. 11 depicts a circuit diagram of a balun of a millimeter wave RF phase shifter according to example embodiments of the present disclosure.

In some implementations, the RF phase shifter 200 (FIG. 2) can include a balun. FIG. 11 depicts a circuit diagram of an active balun 900 according to example embodiments of the present disclosure. As shown, the active balun 900 can include an amplifier 910. Examples of the amplifier 910 can include any suitable type of transistor. For instance, in some implementations, the amplifier 910 can be a bipolar junction transistor (BJT). In alternative implementations, the amplifier 910 can be a metal-oxide field effect transistor (MOSFET).

The amplifier 910 can include a first terminal 912, a second terminal 914, and a third terminal 916. The first terminal 912 can be coupled to the input 210 (FIG. 2) of the RF phase shifter 200 (FIG. 1) via one or more conductors (e.g., wires). In some implementations, the active balun 900 can include a capacitor C coupled between the first terminal 912 and the input 210 (FIG. 2) of the RF phase shifter 200. The second terminal 814 can be coupled to a power supply 930 via one or more conductors. In some implementations, the active balun 900 can include a first resistor R1 coupled between the second terminal 914 and the power supply 930. The third terminal 916 can be coupled to ground GND via one or more conductors. In some implementations, the active balun 900 can include a second resistor R2 coupled between the third terminal 916 and ground GND.

As shown, the active balun 900 can include a first output 950 and a second output 960. It should be appreciated that a phase of a RF signal emitted via the first output 950 can be different than a phase of a RF signal emitted via the second output 960. For instance, the RF signal emitted via the second output 960 can be about one hundred and eighty degrees (e.g., 180°) out-of-phase relative to the RF signal emitted via the first output 950.

Figure 12:
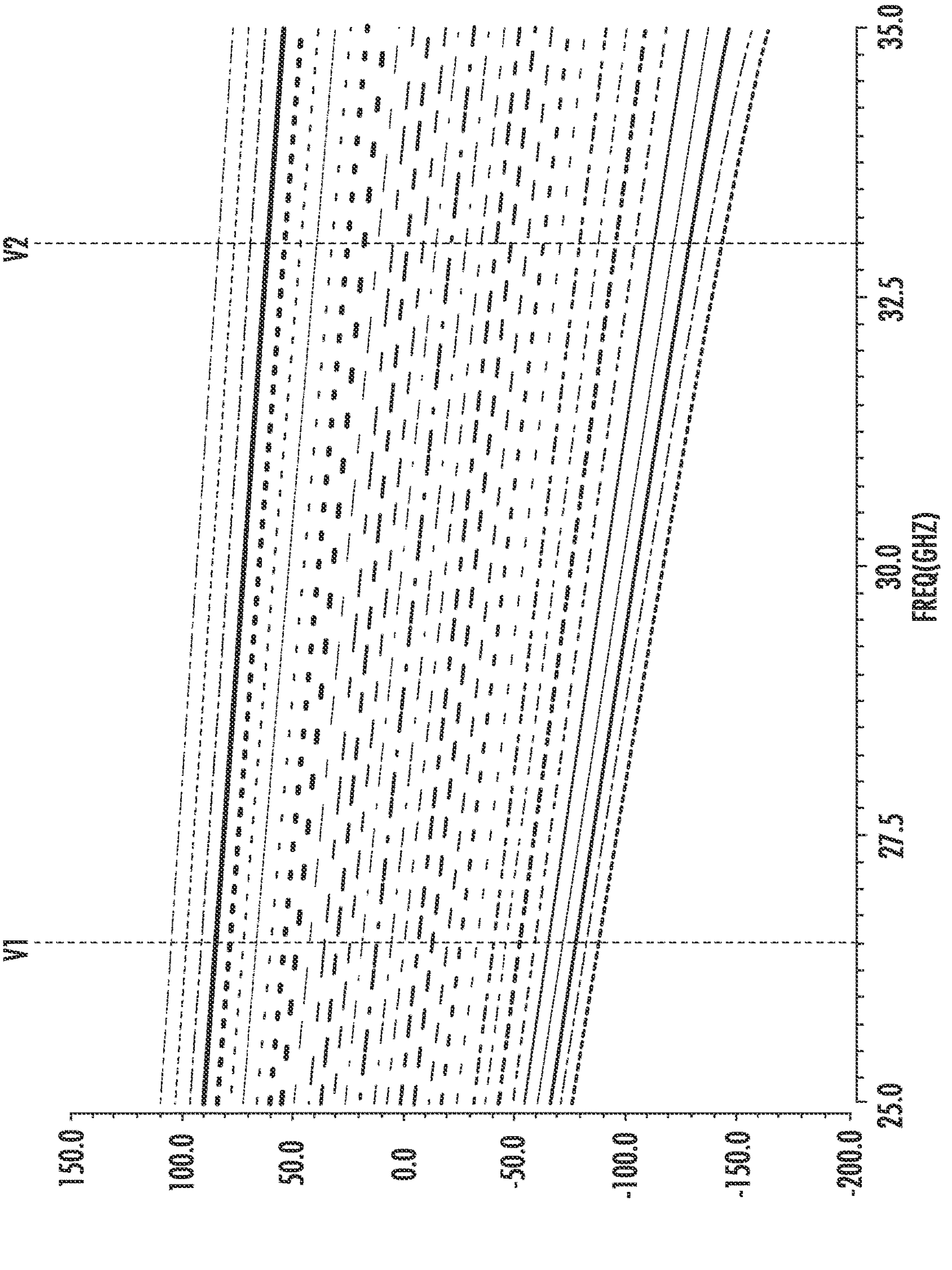
FIG. 12 depicts a graphical representation of a phase shift provided by a millimeter wave RF phase shifter according to example embodiments of the present disclosure.

Referring now to FIG. 12, a graphical representation of a phase shift of a RF signal that occurs based on adjusting an electrical length of the transmission line of the RF phase shifter according to example embodiments of the present disclosure. As shown, the graph in FIG. 12 illustrates phase (denoted along the vertical axis in degrees) of an RF signal the RF phase shifter outputs as a function of frequency (denoted along the horizontal axis in gigahertz). More specifically, the graph in FIG. 12 illustrates the phase shift (measured in degrees) of the RF that occurs as the electrical length of the transmission line of the RF phase shifter is adjusted (e.g., lengthened or shortened). Each curve of the plurality of curves depicted in the graph of FIG. 12 is indicative of behavior of a corresponding tap (e.g., 32 taps) when selected via the switching device 240 (FIG. 5). Although the graph of FIG. 12 depicts the phase shift of the RF signal occurring over a range of frequencies spanning from 26.5 GHz to 33 GHz, it should be appreciated that the RF phase shifter of the present disclosure can provide the same or similar to the RF signal over any suitable range of frequencies.

Figure 13:
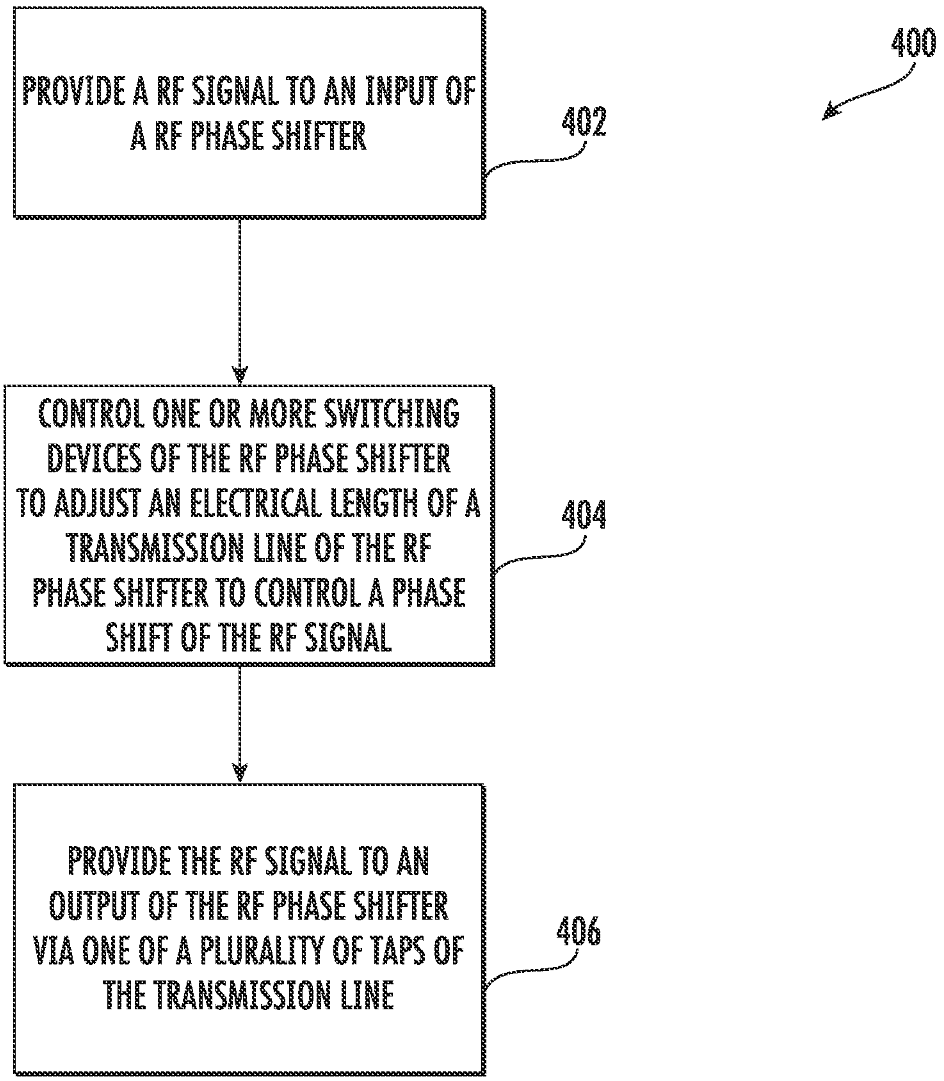
FIG. 13 depicts a flow diagram of a method for controlling operation of a millimeter wave RF phase shifter according to example embodiments of the present disclosure.

Referring now to FIG. 13, a flow diagram of a method 400 for controlling operation of a millimeter wave RF phase shifter is provided according to example embodiments of the present disclosure. In general, the method 400 will be discussed herein with reference to the millimeter wave RF phase shifter described above with reference to FIG. 2. However, although FIG. 13 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (402), the method 400 includes obtaining, by one or more control devices, data indicative of a desired phase shift of a RF signal provided to a RF phase shifter. In example embodiments, the RF signal can be a millimeter RF signal have a frequency between about 26.5 GHz and about 33 GHz. It should be appreciated, however, that the RF signal can have any suitable frequency.

At (404), the method 400 can include controlling, by one or more control devices, a plurality of switching devices of the RF phase shifter to adjust an electrical length of a transmission line of the RF phase shifter based, at least in part, on the data indicative of desired phase shift. In example embodiments, controlling operation of the plurality of switching devices can include providing, by the one or more control devices, a bias signal to a first switching device of the plurality of switching devise to couple the first switching device to a corresponding tap of the transmission line. Additionally, controlling operation of the plurality of switching elements can include providing, by the one or more control devices, a control signal to a second switching device of the plurality of switching devices to couple the corresponding tap of the transmission line to an output of the RF phase shifter via the first switching device.

At (406), the method 400 can include providing, by the one or more control devices, the RF signal to an output of the RF phase shifter via one of the plurality of taps coupled to the output at (404). In example embodiments, the output of the RF phase shifter can be coupled to one antenna element of a plurality of antenna elements included as part of a phased array antenna system.

Figure 14:
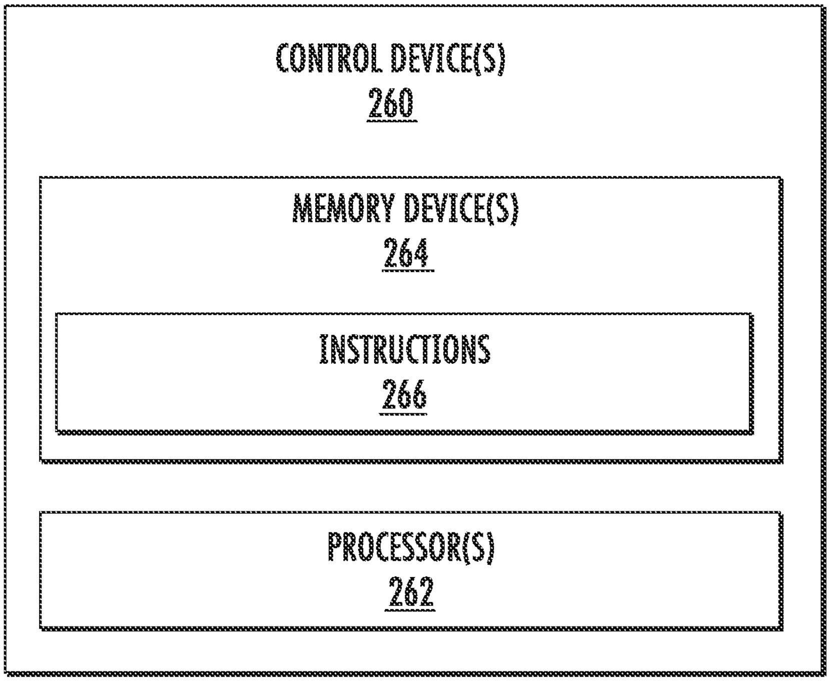
FIG. 14 depicts a block diagram of components of a control device according to example embodiments of the present disclosure.

FIG. 14 illustrates one embodiment of suitable components of the control device 260 according to example embodiments of the present disclosure. As shown, the control device 260 can include one or more processors 262 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the control device 260 can include a memory device 264. Examples of the memory device 264 can include computer-readable media including, but not limited to, non-transitory computer-readable media, such as RAM, ROM, hard drives, flash drives, or other suitable memory devices. The memory device 264 can store information accessible by the processor(s) 262, including computer-readable instructions 266 that can be executed by the processor(s) 262. The computer-readable instructions 266 can be any set of instructions that, when executed by the processor(s) 262, cause the processor(s) 262 to perform operations. The computer-readable instructions 266 can be software written in any suitable programming language or can be implemented in hardware.

In some implementations, the computer-readable instructions 266 can be executed by the control device 260 to perform operations, such as generating one or more control actions to control operation of the plurality of switching devices 240 (FIG. 2). In some embodiments, the control action can include coupling one of the plurality of taps 232 (FIG. 2) of the transmission line 230 (FIG. 2) to the output 220 (FIG. 2) of the RF phase shifter 200 via one of the plurality of switching devices 240. In this manner, the control device 260 can adjust an electrical length of the transmission line 230 to control a phase shift of a RF signal propagating along the transmission line 230.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A millimeter wave radio frequency (RF) phase shifter, comprising:

an input;

an output;

a transmission line coupled to the input, the transmission line having a plurality of taps;

a first plurality of switching devices;

wherein each of the first plurality of switching devices comprises a first terminal coupled to the input, a second terminal coupled to a power supply, and a third terminal coupled to ground;

a second plurality of switching devices, each of the second plurality of switching devices coupled between the output and a corresponding switching device of the first plurality of switching devices; and wherein each of the second plurality of switching devices comprises a first terminal coupled to ground, a second terminal coupled to a power supply, and a third terminal coupled to ground; and a control device operatively coupled to the plurality of first switching devices and the plurality of second switching devices, the control device configured to control operation of the plurality of first switching devices and the plurality of second switching devices to selectively couple one of the plurality of taps to the output to adjust an electrical length of the transmission line to control a phase shift of a RF signal propagating on the transmission line.

2. The millimeter wave RF phase shifter of claim 1, wherein the plurality of taps are spaced apart from one another along a length of the transmission line.

3. The millimeter wave RF phase shifter of claim 1, wherein the transmission line is a meander transmission line having one or more bends between a first end of the meander transmission line and a second end of the meander transmission line.

4. A phased array antenna system, comprising:

a plurality of antenna elements; and a plurality of millimeter wave radio frequency (RF) phase shifters, each of the plurality of millimeter wave RF phase shifter comprising:

an input couplable to the RF source;

an output couplable to a corresponding antenna element of the plurality of antenna elements;

a transmission line coupled to the input, the transmission line having a plurality of taps;

a first plurality of switching devices;

wherein each of the first plurality of switching devices comprises a first terminal coupled to the input, a second terminal coupled to a power supply, and a third terminal coupled to ground;

a second plurality of switching devices, each of the second plurality of switching devices coupled between the output and a corresponding switching device of the first plurality of switching devices;

wherein each of the second plurality of switching devices comprises a first terminal coupled to ground, a second terminal coupled to a power supply, and a third terminal coupled to ground; and a control device operatively coupled to the plurality of first switching devices and the plurality of second switching devices, the control device configured to control operation of the plurality of first switching devices and the plurality of second switching devices to selectively couple one of the plurality of taps to the output to adjust an electrical length of the transmission line to control a phase shift of a RF signal propagating on the transmission line.

5. The phased array antenna system of claim 4, wherein the plurality of taps are spaced apart from one another along a length of the transmission line.

6. The phased array antenna system of claim 4, wherein the transmission line is a meander transmission line having one or more bends between a first end of the meander transmission line and a second end of the meander transmission line.

7. The millimeter wave RF phase shifter of claim 1, wherein each of the first plurality of switching devices and each of the second plurality of switching devices comprise a transistor.

8. The millimeter wave RF phase shifter of claim 7, wherein the transistor comprises a bipolar junction transistor or a metal-oxide field effect transistor.

9. The millimeter wave RF phase shifter of claim 1, further comprising:

a first RF signal emitting via a first output, the first output is between the second terminal and the power supply of the first plurality of switching devices;

a second RF signal emitting via a second output, the second output is between the second terminal and the power supply of the second plurality of switching devices; and wherein the first RF signal is different from the second RF Signal.

10. The millimeter wave RF phase shifter of claim 1, further comprising:

a plurality of conductors, each of the plurality of conductors coupled between the first terminal coupled and the input, the second terminal and the power supply, the third terminal and the ground of the first plurality of switching devices.

11. The millimeter wave RF phase shifter of claim 1, further comprising:

a plurality of conductors, each of the plurality of conductors coupled between the first terminal and the ground, the second terminal and the power supply, a third terminal and the ground of the second plurality of switching devices.

12. The millimeter wave RF phase shifter of claim 11, further comprising:

a resistor coupled between an electrical ground and the second end of the meander transmission line.

13. The millimeter wave RF phase shifter of claim 1, wherein a length of the transmission line ranges from about 510 micrometers to about 560 micrometers.

14. The phased array antenna system of claim 4, wherein the transmission line is a meander transmission line having one or more bends between a first end of the meander transmission line and a second end of the meander transmission line.

15. The phased array antenna system of claim 4, wherein each of the first plurality of switching devices and each of the second plurality of switching devices comprise a transistor.

16. The millimeter wave RF phase shifter of claim 15, wherein the transistor comprises a bipolar junction transistor or a metal-oxide field effect transistor.

17. The phased array antenna system of claim 4, wherein each of the first plurality of switching devices is configured to emit a first RF signal via a first output, the first output is between the second terminal and the power supply;

wherein each of the second plurality of switching devices is configured emit a second output, the second output is between the second terminal and the power supply; and wherein the first RF signal is different from the second output.

18. The phased array antenna system of claim 4, wherein the first plurality of switching devices further comprising:

a plurality of conductors, each of the plurality of conductors coupled between the first terminal coupled and the input, the second terminal and the power supply, the third terminal and the ground.

19. The phased array antenna system of claim 4, wherein the second plurality of switching devices further comprising:

a plurality of conductors, each of the plurality of conductors coupled between the first terminal and the ground, the second terminal and the power supply, a third terminal and the ground.

* * * * *